Jan. 16, 1940.    S. B. MARTIN    2,187,089
PUSHER
Filed Oct. 26, 1938
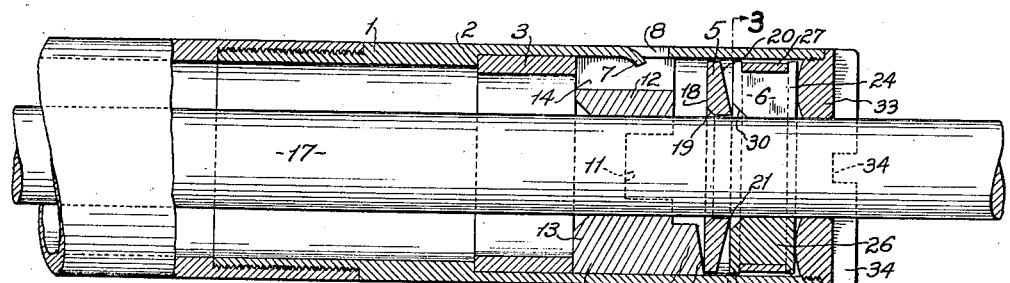
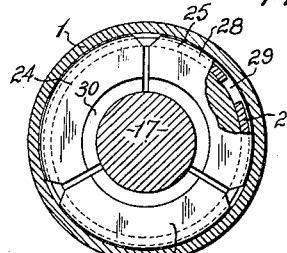
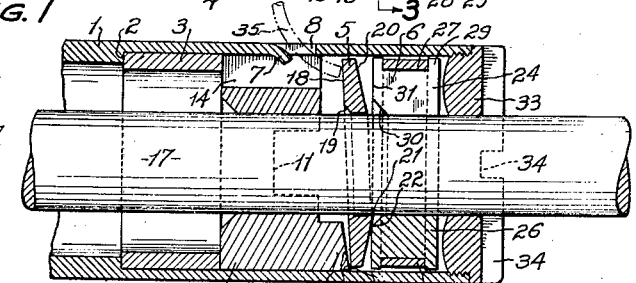
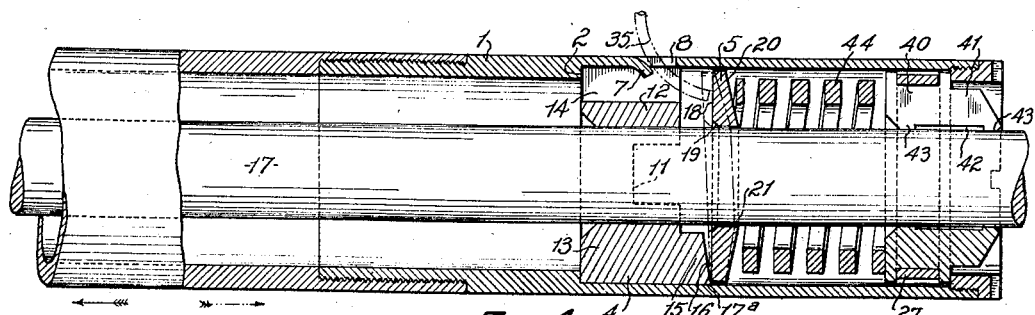
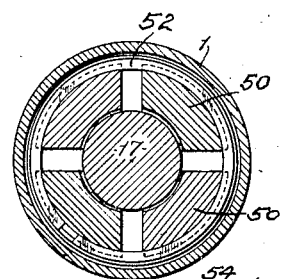
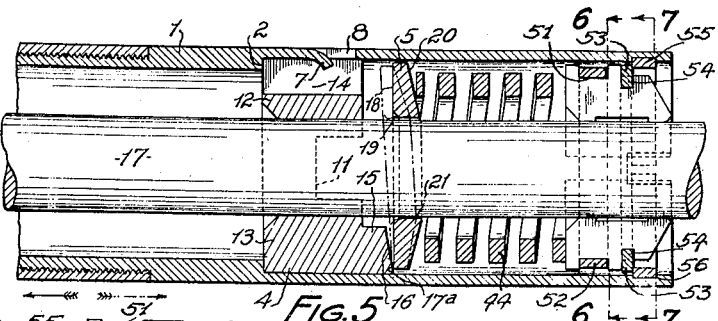
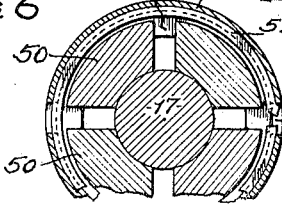
INVENTOR:
STODDARD B. MARTIN
BY Howard & Sanborn
HIS ATTORNEYS.

Patented Jan. 16, 1940

2,187,089

UNITED STATES PATENT OFFICE 2,187,089

PUSHER

Stoddard B. Martin, Lakewood, Ohio

Application October 26, 1938, Serial No. 237,086

9 Claims. (Cl. 29—61)

My invention relates to automatic screw machines and the like, in which bar stock is fed automatically axially toward a tool in intermittent fashion, and more specifically is an improvement in pushers through and by which the bar stock is fed.

One of the objects of my invention resides in a pusher having bar stock gripping means in the discharge end thereof whereby to materially reduce the waste stock ends to a minimum as the trailing end of the bar stock approaches the tool.

Another object of the invention is to provide a pusher having means therein for gripping the bar stock to prevent relative axial movement of the stock in the pusher tube when the latter is moved to feed the bar forwardly, and at the same time to provide means within the forward end of the pusher tube whereby the bar may be gripped as the tube is advanced toward the tool and thereby through said means to increase the biting effect of the aforesaid stock gripping means.

A further object is to provide a pusher of the type indicated, having bar stock gripping means within the pusher which is of simple construction, yet which is double acting in its nature; that is, to exert an additional pressure upon the bar locking or gripping ring when the tube is moved in one axial direction and to exert a pressure on the bar when the tube is moved in an opposite axial direction.

Other objects and advantages of my invention will become apparent from the following description of several embodiments thereof, reference being made to the accompanying drawing, in which like reference characters are employed to designate like parts throughout the same.

In the drawing:

Figure 1 is a longitudinal sectional view through a pusher embodying one form of my invention, and shows the same with the locking ring in released position, such as when the tube is being retracted;

Figure 2 is a sectional view similar to that shown in Figure 1, but illustrates the manner in which the locking ring grips the bar stock when the tube is moved in an opposite direction or toward the tool;

Figure 3 is a sectional view taken on line 3—3 of Figure 1;

Figure 4 is a longitudinal section through a pusher tube embodying a second form of my invention, and in dotted lines shows the locking ring in stock gripping position;

Figure 5 is a view similar to those of Figures 1 and 4; but illustrates a third embodiment of my invention;

Figure 6 is a transverse section taken on line 6—6 of Figure 5;

Figure 7 is a transverse section taken on line 7—7 of Figure 5;

Figure 8 is a side view of one of the front bushing pads; and

Figure 9 is an end view of the pad shown in Figure 8.

I will first describe the form of my invention illustrated in Figures 1-3 inclusive.

The pusher tube is indicated at 1, and is provided with an internal shoulder 2, against which is seated the spacing member 3 or the bushing 4 in the event the spacing ring 3 is not used. As shown in the drawing, however, I employ the spacing ring 3 in order to place the bushing 4 in a more forward position near the forward end of the pusher tube 1. This is particularly desirable when no spring is employed between the stock gripping ring 5 and the end gripping bushing 6, such as is illustrated in several other views of the accompanying drawing in connection with other embodiments of my invention.

The pusher tube is provided with an inwardly extending tongue 7, which is formed by puncturing the tube at 8, and then bending the tongue downwardly as indicated in Figure 1.

The bushing 4 comprises a thick ring-like member having an axial opening of pre-determined inside diameter for use with a pre-determined size bar stock. The bushing 4 is provided with a transverse slot 11, which extends diametrically across the bushing and divides the same into an upper portion 12 and a lower portion 13.

The upper portion 12 is slotted inwardly from its outer circumferential wall and longitudinally of the bushing as at 14. This slot serves as a guide within which the tongue 7 projects to position the bushing within the pusher tube against relative rotation therein, but permits axial movement of the bushing in the tube.

The lower portion of the bushing 4 is provided along its forward face with an extended portion 15 having an inclined forward face 16.

It will be noted that the extended portion 15 extends beyond the diametrically opposite part of the bushing at 12 so that when the ring 5 is in locking position, as shown in Figure 2, the upper part of the ring will be spaced from the upper part of the bushing, while the lower part of the ring will tend to approach the face 16 of the lower part of bushing, and will actually contact the bushing at its lowermost portion at 17a.

As the bar stock 17 passes axially through the pusher tube and the bushing 4, it also passes through the ring 5, which has an internal diameter sufficiently greater than the outside diameter of the bar stock to permit the ring to be slightly tilted on the bar stock as indicated in Figure 2.

The ring 5 is flat along its rear face, as at 18, and the portion of this face which lies next to the central opening of the ring is inclined as at 19, to guide the forward end of the bar stock in entering the ring.

The forward face 20 of the ring is convex in cross-section, as indicated in the drawing, the outer peripheral thickness of the ring being less than that of the inner portion of the ring near the central opening thereof.

In this manner the ring 5 is adapted to bitingly engage the bar stock passing therethrough as indicated at 21 when the ring is tilted as in Figure 2. The ring is urged to tilted position upon a feeding movement of the pusher tube to the right as indicated by the arrow.

When the tube is moved to the right, the inclined face 15 of the bushing 4 will push the lower portion of the loose ring 5 to the right, thereby tilting the ring as shown and bitingly engaging its sharp edge 21 with the stock material. It is to be noted that the convex forward face 20 of the ring 5 abuts the rear face of one of the segments of the forward bushing 6 at a point 22 when the ring is tilted. The resultant action of the ring may be defined as tilting about the point 22 as a fulcrum, forward pressure being applied by the bushing 4 in forward movement of the tube, and the edge 21 of the ring biting into the stock bar 17.

In accordance with my invention, I have provided bushing means carried by the stock and located close to the forward end of the pusher tube for clutching the bar stock as the same passes therethrough. This clutching means is indicated generally at 6 and provides an abutment on the bar stock for the tiltable ring 5. While the bushing 6 is designed to clutch the bar stock, it also permits retraction of the pusher tube while the stock is held by the usual collet (not shown).

This clutching means 6 is in the form of a split bushing, and serves to support the bar stock in the forward end of the tube, and by its forward location insures less waste of bar stock material as the trailing end of the bar approaches the tool.

Referring more particularly to Figure 3, this clutching means is shown as comprising a bushing split into three sections, 24, 25, and 26, which are held together by means of a split, resilient annulus 27 seated between the peripheral ribs 28 and 29 of the assembled bushing sections.

The spring 27 serves to contract the sections 24, 25, and 26 into firm gripping contact with the bar stock 17 passing therethrough. At the point where the forward end of the bar stock enters the split bushing, the respective sections are bevelled as at 30 to ease the bar into the central opening formed by the contracted sections. The rear face 31 of the bushing members also serves as an abutment against which the forward inclined face of the ring 5 engages at 22.

The entire assembly, including the spacer 3, bushing 4, the gripping ring 5, and the split bushing 6, are all readily removable and accessible from the forward end of the pusher tube by removing the end nut 33, which is threaded into the forward end of the pusher tube. This nut is, of course, provided with a central opening to accommodate the stock bar 17, and is also provided with intersecting slots 34 so that a tool may be applied to the nut to remove the same.

The transverse opening 11 in the bushing 4 serves the function of collecting chips or other particles of metal, which may find their way into this part of the interior of the pusher tube, and the same may readily be cleaned out by removing this bushing along with the gripping ring and the clutch 6.

The gripping ring 5 may be released manually from its tilted gripping position, and the bar stock may be readily removed from the pusher by inserting a wire or tool 35 into the slot 8 in the pusher tube to contact the rear face of the ring 5 and thereby return the ring to the upright or vertical position shown in Figure 1.

In Figure 4 I have illustrated a modification of the invention shown in Figures 1 to 3. In this form of the invention I have slightly modified the forward stock supporting and gripping bushing to the extent that the complementary bushing segments 40 are each provided with a forwardly extending bar support 41. By this means not only is a larger bar supporting area provided by the inner walls of the extension 41, but the longer bushing segments will further reduce waste in bar stock by leaving a shorter end in the pusher as the bar is used up. Each of the segments may be relieved as at 42 providing spaced annular portions 43 to grip the bar 17.

In this modification also, I have provided a compression spring 44 between the biting ring 5 and the split bushing 40 for the purpose of overcoming or preventing any tendency of the ring 5 to slip on the stock when it is tilted during forward motion of the pusher. I find that by providing a forward bushing 40, the biting effect of the ring 5 will be increased as the spring 44 is compressed by forward movement of the tube, providing the ring 5 slips.

Furthermore, when the pusher is retracted to the left in the drawing, the action of the spring upon the ring 5 and the clutching effect of the bushing 40 will not interfere with such movement.

In Figures 5 to 9 inclusive I have illustrated still another embodiment of the invention which in many respects is identical with the forms heretofore described, but which differs essentially in the means for retaining and spacing the forward supporting bushing segments shown in detail in Figures 6 to 9 inclusive, in the tube end.

Each of the bushing segments 50 is provided with a peripheral groove 51 for receiving a split contractible ring 52 to bind the segments 50 together.

A ring 53, which may be a metal stamping, is provided for the purpose of spacing or separating the segments 50. Projecting radially inwardly of the ring 53 are a plurality of lugs or spacers 54 which engage the adjacent side walls of the segments 50 to maintain the spaced segments in substantially the spaced relation shown.

The spacer ring, being located near the front end of the bushing, does not, however, interfere with the proper functioning of the contracting spring 51 which serves to bind the segments radially together toward the axis of the assembled bushing.

I have provided another ring of expandable spring metal 55, which serves to lock the assembled bushing 50 in the forward end of the pusher tube. The spring 55 is normally expanded into the inner annular groove 56 formed in the end of the pusher tube, but the thickness of the spring is sufficient to overlie the spacer ring 53 as well as the adjacent side wall of the groove 56, thus retaining the end bushing against forward movement within the pusher tube and against the spring 44 to exert a force of compression against the latter.

The expansion locking spring 55 is of course split transversely and its ends are, or one of them is, bent outwardly slightly to project into the slot 57 formed in the end of the pusher tube. The operator may easily remove the locking ring 55 by inserting a screw driver or other pointed tool in the slot 57 to pry the spring 55 out of the groove 56. In this manner the bushing 50, the spring 44, the ring 5, and the bushing 4 may all be removed from the forward end of the pusher tube for cleaning or for replacement of the two bushings and ring 5 by others having an internal diameter of a size to properly accommodate a selected diameter of bar stock.

Thus, it will be seen that the bushing 50, by means of the contractible ring 52, is caused to sufficiently grip the bar stock 17 extending therethrough to momentarily prevent relative movement therebetween when the tube is moved to the right to feed the stock to the tool.

In this manner the compression of the spring 44 is increased by the bushing 50 until it overcomes any slipping of the tilted biting ring 5. The greater the compression of the spring 44 against the ring 5, the greater will be the biting effect at the point 21 of the ring upon the stock, thus enabling the tube 1, the ring 5, the bushings 4, and 50, to move as a unit to the right to complete the feeding stroke of the tube.

As the tube is retracted to the left, the bushing will abut the retaining member 55 by contact of the spacer ring 53 therewith, thus permitting partial release of the compression of the spring 44 and permitting the ring 5 to again assume the full line or vertical position. As the tube is further retracted, relative movement between the stock, now held by the usual collet (not shown) and the front bushing 50 is possible since the clutching effect of the radial pressure on the bushing segments will be overcome by the usual tube retracting means (not shown) through the abutting members 55 and 53.

Various changes in the details of construction and arrangement of parts may be made without departing from the spirit of my invention or the scope of the appended claims.

I claim:

1. In a pusher for automatic screw machines and the like, a tube, spaced bushings within the tube for supporting the bar stock axially therein, and tiltable stock gripping means between said bushings preventing axial movement of the stock in one direction, one of said bushings engageable with said tiltable gripping means at a point near the outer edge of the gripping means when the pusher is moved in a feeding direction, the other of said bushings being contractible on said bar stock to clutch the same and engageable with the gripping means at a point on its opposite side to tilt said means.

2. In a pusher for automatic screw machines and the like, a tube, spaced bushings within the tube for supporting the bar stock axially therein, and tiltable stock gripping means between said bushings preventing axial movement of the stock in one direction, one of said bushings comprising a plurality of complementary segments movable radially to grip said bar stock, a spring for binding said segments together as a unit, and means retaining said one bushing in the tube.

3. In a pusher for automatic screw machines and the like, a tube, spaced bushings within the tube for supporting the bar stock axially therein, and stock gripping means between said bushings preventing axial movement of the stock in one direction, one of said bushings being characterized by its ability to clutch the bar stock, and a compression spring axially disposed between said bar clutching bushing and said stock gripping means to exert a force upon the said means in a direction opposite to that of stock fed through the tube, whereby to overcome any tendency of said gripping means to slip along the bar stock.

4. In a pusher, a tube, a stock supporting bushing in the tube, said bushing having one face thereof inclined, a tiltable stock gripping ring, and means for tilting said ring for biting engagement with a piece of stock disposed axially in the tube, said gripping ring having a convex face engageable with said ring tilting means.

5. In a pusher, a tube having an opening formed in its wall and a tongue projecting through said opening and into the interior of the tube, a stock supporting bushing in the tube, and a tiltable stock gripping ring disposed transversely within the tube, said bushing having a slot formed therein for receiving said tongue to prevent relative rotational movement between the tube and the bushing, said opening in said tube being provided for the insertion of an elongated member adapted to engage and release the tilted ring from gripping engagement with the bar stock.

6. In a pusher tube, a pair of spaced stock supporting bushings and releasable stock holding means between said bushings, one of said bushings comprising an annulus formed of a plurality of bushing segments extending from a point near the delivery end of the pusher tube to the end thereof, and a spring for contracting said segments radially about a length of stock in the tube.

7. In a pusher tube, a pair of spaced stock supporting bushings and releasable stock holding means between said bushings, one of said bushings comprising an annular member formed of a plurality of bushing segments extending from a point near the forward end of the tube to substantially the delivery end of the pusher tube, and a contractible member engageable with said segments to press the same radially into gripping engagement with a length of stock extending into said bushing, and means for spacing said segments in gripping relation on the stock.

8. In a pusher tube, a pair of spaced stock supporting bushings and releasable stock holding means between said bushings, one of said bushings comprising an annular member having a plurality of bushing segments extending substantially to the delivery end of the pusher tube, and a contractible member engageable with said segments to press the same radially into gripping engagement with a length of stock extending into said bushing and resilient retaining means carried by the end of said tube to retain the bushing in the tube.

9. In a pusher tube, a pair of spaced stock supporting bushings and releasable stock holding means between said bushings, one of said bushings comprising an annular member having a plurality of bushing segments extending substantially to the delivery end of the pusher tube, and a contractible member engageable with said segments to press the same radially into gripping engagement with a length of stock extending into said bushing, a spacer removably carried by the bushing segments to space the latter radially on the bar stock, and retaining means in the delivery end of the tube and engageable with said spacer to retain the bushing in the tube.

STODDARD B. MARTIN.